United States Patent [19]
Kim

[11] Patent Number: 4,752,829
[45] Date of Patent: Jun. 21, 1988

[54] MULTIPACKET CHARGE TRANSFER IMAGE SENSOR AND METHOD

[75] Inventor: Jae S. Kim, Cupertino, Calif.

[73] Assignee: Fairchild Weston Systems, Inc., Sunnyvale, Calif.

[21] Appl. No.: 947,131

[22] Filed: Dec. 29, 1986

[51] Int. Cl.⁴ ............................................. H04N 3/14
[52] U.S. Cl. ......................... 358/213.31; 358/213.26; 358/213.29
[58] Field of Search ...................... 358/213.31, 213.29, 358/213.26; 357/241 R

[56] References Cited

U.S. PATENT DOCUMENTS

| | | | |
|---|---|---|---|
| 3,715,485 | 2/1973 | Weimer | 178/7.1 |
| 3,763,480 | 10/1973 | Weimer | 340/173 R |
| 4,380,755 | 4/1983 | Endlicher et al. | 382/68 |
| 4,447,735 | 5/1984 | Horii | 250/578 |
| 4,514,766 | 4/1985 | Koike et al. | 358/213 |
| 4,528,594 | 7/1985 | Kadekodi et al. | 358/213 |
| 4,528,595 | 7/1985 | Eouzan | 358/213 |
| 4,547,677 | 10/1985 | Parker | 250/578 |
| 4,559,550 | 12/1985 | Koike et al. | 357/24 |
| 4,620,231 | 10/1986 | Kosonocky | 358/213.29 |
| 4,652,925 | 3/1987 | Kimata | 358/213.29 |

FOREIGN PATENT DOCUMENTS 55-121642  9/1980  Japan .

OTHER PUBLICATIONS

H. Heyns, et al., "Image Sensor with Resistive Electrodes," *Philips Tech. Review*, 37(11/12):303-311.
M. Kimata et al., "A 480×400 Element Image Sensor with a Charge Sweep; Device," *1985 IEEE International Solid-State Circuits Conference Digest of Technical Papers*, pp. 100-101.
Y. Ishirara, et al., "Advances in CCD and Imaging," *1980 IEEE International Solid-State Circuits Conference Digest of Technical Papers*, pp. 24-25.

Primary Examiner—Jin F. Ng
Assistant Examiner—Stephen Brinich
Attorney, Agent, or Firm—Dale Gaudier; Robert C. Colwell; James M. Heslin

[57] ABSTRACT

An image sensor is disclosed which is capable of handling large amounts of signal charge with small shift registers. The image sensor includes photoelements 10 in which charge is accumulated in response to sensed conditions; electrically-controllable transfer gates 20 adjacent the photoelements 10 for controllably releasing the charge from the photoelements; vertical shift registers 30, separated from the photoelements 10 by the transfer gates 20, for receiving the charge from the photoelements, and a scan generator connected to the barrier 20 for supplying a series of pulses thereto, a group of pulses being required to release all of the charge accumulated in the photoelements 10.

18 Claims, 2 Drawing Sheets

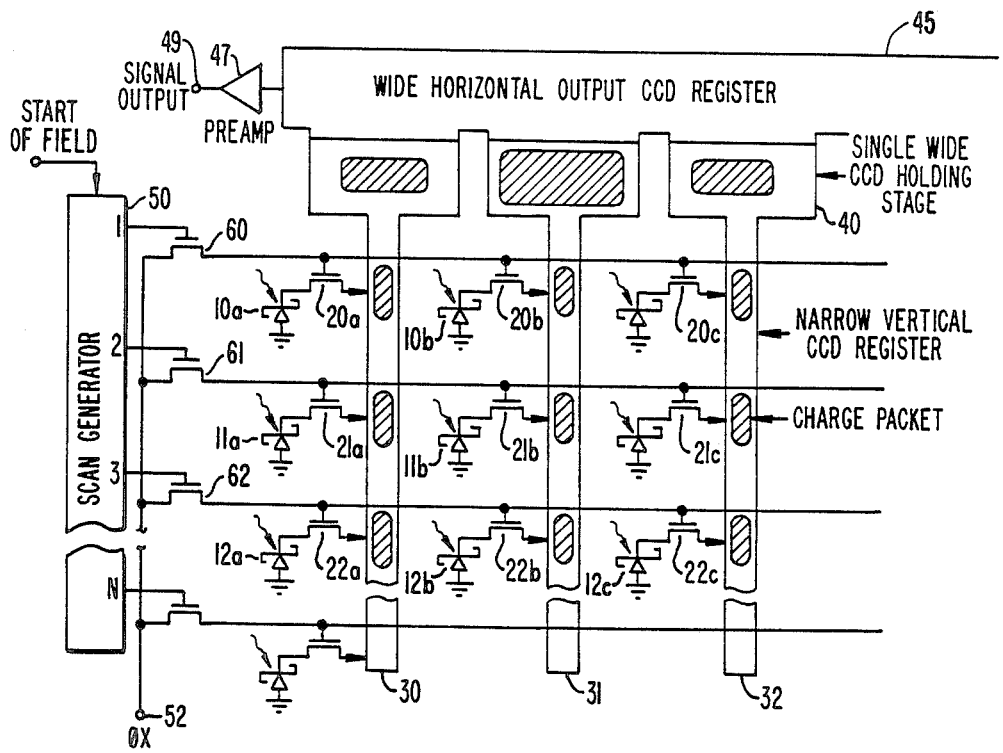
FIG._1.
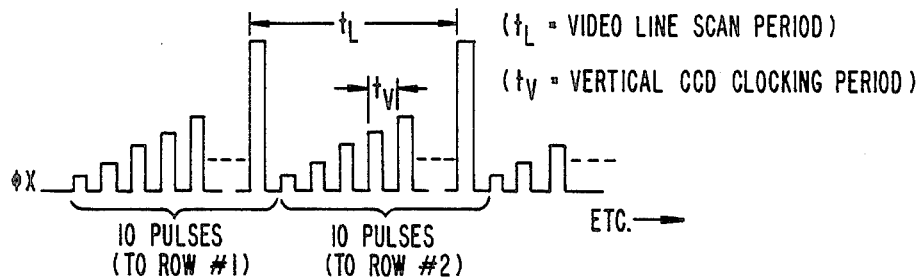
FIG._2.

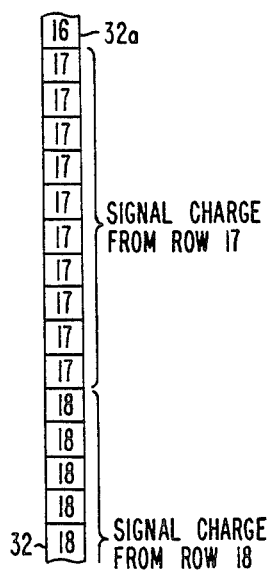
FIG._3.
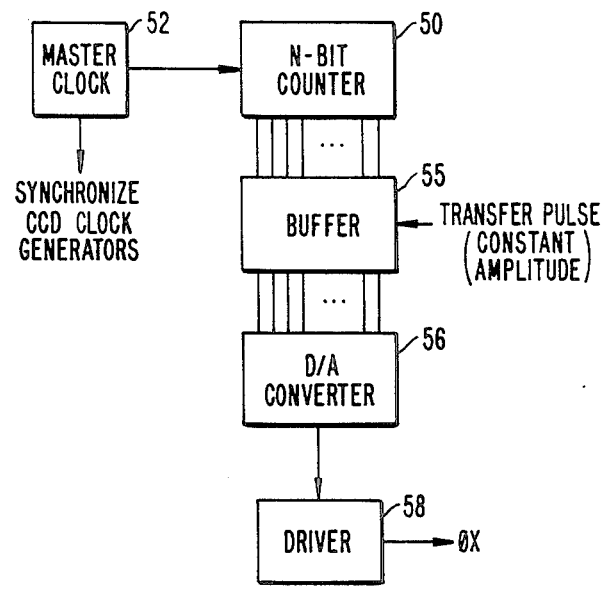
FIG._5.
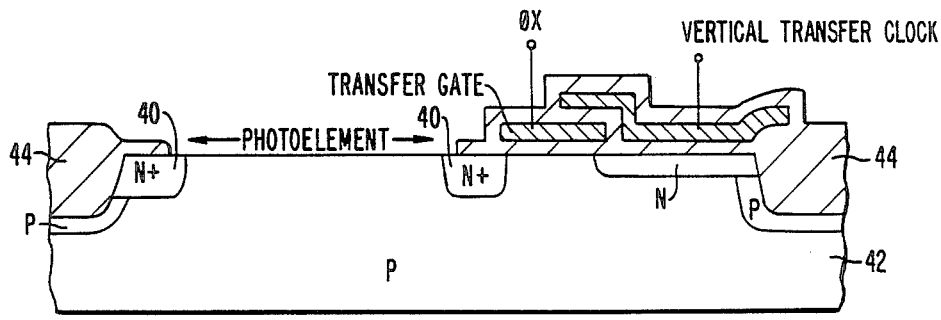
FIG._4a.
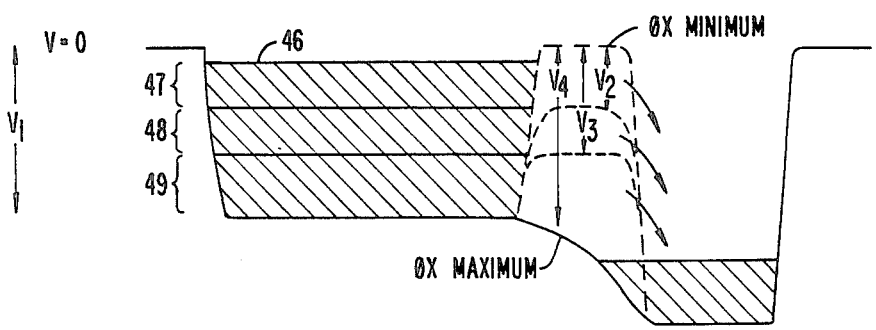
FIG._4b.

MULTIPACKET CHARGE TRANSFER IMAGE SENSOR AND METHOD

BACKGROUND OF THE INVENTION

1. Field of the Invention

This invention relates to semiconductor devices and to charge-coupled devices. More particularly, the invention relates to a method and apparatus for the transfer of charge accumulated in photoelements of charge-coupled imaging devices into a register in multiple packets.

2. Description of the Prior Art

Charge-coupled imaging devices are well known and widely used. In such devices a linear series of light sensitive imaging elements, or an area array of such elements, accumulate charge in response to ambient conditions. In the case of area imaging devices, by employing a lens to focus ambient light, charge accumulates in individual photoelements as a function of the intensity of the radiation from different portions of a scene focused onto the charge-coupled device. Such area imaging devices may be employed in solid-state video cameras in place of conventional, bulky, heavy and power-consuming tubes.

CCD area imaging sensors typically are fabricated by providing an array of photoelements divided into rows and columns. The photoelements typically comprise transparent electrodes for creating potential wells in the substrate. Disposed between each column of photoelements is a "vertical" shift register extending from the top of the array to the bottom. The column of photoelements is separated from the appropriate shift register by electrodes which create a potential barrier in the substrate. During charge integration period the barrier is maintained at a high level by suitable signals. This allows electrons to accumulate in potential wells established beneath the photoelements. At the end of the integration period, an appropriate signal is applied to the transfer gates to lower the barrier to a potential which allows the accumulated charge to flow into the shift register. Once in the shift register, the accumulated charge may be clocked to the top of the array into a "horizontal" register from which it is shifted to a sensing electrode or other detection apparatus which measures the accumulated charge and provide an output signal.

The sensitivity of a CCD area imager depends directly on the fraction of the area of a unit cell which is responsive. Accordingly, to maximize sensitivity, it is desirable to minimize the area occupied by the vertical CCD register. Unfortunately, the amount of charge which may be transferred from a given photoelement and shifted to the horizontal CCD register is determined, in significant part, by the width of the shift register. Wider shift registers are capable of handling greater amounts of charge than narrow ones.

The problem of maintaining the CCD shift registers at a suitably small size, while handling large amounts of charge, is even more acute in the case of infrared image sensors. Because of the low contrast signal in such sensors, very large levels of signal charge, on the order of millions of electrons, need to be accumulated in individual photoelements.

Two approaches have been proposed for handling such large quantities of charge without increasing the size of the vertical shift register. In "A 480×400 Element Image Sensor with a Charge Sweep Device" by M. Kimata et al., 1985 *IEEE International Solid-State Circuits Conference, Digest of Technical Papers*, pp. 100–101, a technique is proposed by which the charge from a single photoelement in each column of photoelements is shifted into the shift register and allowed to overflow along the shift register in both directions. Once all of the accumulated charge from the photoelement is present in the shift register, the entire vertical register is emptied by being clocked out into the horizontal register. While this approach does improve the charge-handling capability of the image sensor, the sensor operates undesirably slowly because as many cycles of the shift register are required for each photoelement as there are elements in a column. Thus, in the described apparatus with 400 rows of photoelements, the entire 400-bit shift register must be emptied for each photoelement, before the charge accumulated in the next photoelement is allowed to flow into the shift register.

A second approach for increasing charge-handling capability without increasing the size of the shift register is described in "Image Sensor with Resistive Electrodes" by H. Heyns et al., *Philips Tech. Review*, 37(11/12):303–311. In this proposal, a single long resistive electrode is provided in place of the discrete elements of the shift register. The resistivity of the electrode allows establishing a voltage gradient along the electrode. In operation, all of the charge from a single photoelement is transferred to beneath the electrode where it flows "down hill" to the horizontal register disposed at an end of the column of photoelements. Unfortunately, such an approach is slow at transferring charge unless a steep voltage gradient is established. Steep voltage gradients are difficult to implement in large devices having numerous photoelements. Additionally, the resistivity of the electrode consumes extra power and alters the thermal characteristics of the charge-coupled device undesirably.

SUMMARY OF THE INVENTION

I have developed a method and apparatus for transferring charge accumulated in CCD area imagers into the shift registers in multiple packets. The system of my invention does not require voltage gradients or complete emptying of large shift registers for each photoelement. In the apparatus of my invention, the signal charge accumulated by the photoelements is released from one row of photoelements at a time, but it is not released all at once. Instead, the accumulated charge is released from the photoelements in stages. After each partial release, the clock driving the vertical shift register is cycled, and then the next fraction of the signal charge released. In a preferred embodiment, ten cycles are used to empty each photoelement. Thus, assuming a signal charge of $1 \times 10^7$ electrons, the use of 10 transfer pulses means that no more than $1 \times 10^6$ electrons are released by any single clock cycle. After 10 cycles the photoelement is empty, and 10 consecutive elements of the shift register each contain $1 \times 10^6$ electrons. This technique allows the shift register to be sized to handle one-tenth the charge of the photoelements.

After a single row of pixels is completely read, the next row may be read. A scan generator is employed to address the rows one at a time, as well as to supply appropriate pulses for releasing the accumulated charge in stages. The output register of my apparatus operates in conventional fashion, but is increased in size to handle the large charge packets. Of course, even with lower quantities of charge, the invention may be employed to increase the area efficiency of the device by reducing the silicon area necessary for the shift register.

In a preferred embodiment, apparatus for sensing an image according to my invention includes photoelements for accumulating charge in response to sensed conditions, transfer gates disposed adjacent the photoelements for controllably releasing the charge from the photoelements, a shift register separated from the photoelements by the transfer gates for receiving the charge from the photoelements, and a scan generator connected to the transfer gates for supplying a series of pulses thereto, the plurality of pulses being required to release all of the charge accumulated in the photoelements.

In another embodiment, my invention consists of a method of increasing the charge-handling capability of a CCD shift register wherein a photoelement for accumulation of electrons is separated from a register by an electrically controllable gate and the method includes: accumulating electrons in the photoelement, and applying a progressively increasing series of pulses to the gate to cause the accumulated electrons to be transferred from the photoelement to the register in a plurality of groups.

BRIEF DESCRIPTION OF THE DRAWINGS

FIG. 1 is a schematic drawing of a top view of a multipacket vertical transfer image sensor.

FIG. 2 is a timing diagram illustrating the signals applied to the transfer gates for transferring charge from the photoelements.

FIG. 3 is a schematic drawing of vertical CCD shift register during operation of the image sensor.

FIG. 4a is a cross-sectional view of a portion of the structure shown in FIG. 1.

FIG. 4b is a potential diagram illustrating the fractional release of charge by the structure of FIG. 4a.

FIG. 5 is a block diagram of a transfer pulse generator.

DETAILED DESCRIPTION OF THE PREFERRED EMBODIMENT

FIG. 1 is a schematic view of one embodiment of the multipacket vertical transfer image sensor of my invention. The image sensor includes a large number of light sensitive elements 10, 11, 12, etc. Typically, each photoelement is a potential well in a silicon body created by imposition of an appropriate voltage on a photoelectrode. A photoelectrode may be formed by a transparent electrode deposited on an insulating layer on a semiconductor substrate, or by a doped region in the substrate. The photoelements generally are arranged in rows and columns as depicted in the drawing. The ultimate size of the image sensor is variable, but in some embodiments will have hundreds of rows and columns of photoelements, for example, 512 columns and 512 rows. In the well known manner of charge-coupled devices, in response to light striking a photoelement, charge accumulates in the potential well beneath that photoelement. The longer the time and the more intense the light, the more electrons accumulate within the potential well. In a typical infrared image sensor, millions of electrons may accumulate in each photoelement during a given integration period.

The image sensor also includes a transfer gate 20, 21, 22, etc., associated with each photoelement. For example, photoelement 11b has a transfer gate 21b associated therewith. The transfer gate allows transfer of the electrons accumulated in the photoelement from the photoelement into a corresponding stage of a vertical shift register 30, 31, 32, etc. The transfer gate typically consists of a series of linearly extending electrodes positioned to extend along a column of photoelements. The vertical shift registers 30, 31, 32, are disposed between columns of the photoelements. In response to appropriate signals applied to the transfer gates 20, 21, 22, the potential barrier beneath the transfer gate is lowered to allow the accumulated electrons to flow over the barrier and into the lower potential well beneath the shift register electrodes. Once within the vertical shift registers 30, 31, 32, the accumulated packets of electrons are shifted to the top of the shift registers into a horizontal output register 45. The output register allows sensing of the accumulated charge using conventional CCD techniques. The resulting signal may be amplified by an amplifier 47 before being supplied to an output terminal 49.

In conventional prior art charge-coupled device image sensors, all of the signal charge within a given photoelement 10, 11, 12, is transferred into the vertical shift register 30, 31, 32, using a single pulse on the transfer gate 20, 21, 22. These charge packets then are shifted to the register at the top of the image sensor for detection and amplification. This approach is not satisfactory in applications where large amounts of charge are to be handled, and high sensitivity imaging is desired. In such applications, the large quantities of charge require very large vertical shift registers, which diminishes the silicon area available for the fabrication of the photoelements.

In a preferred embodiment of my invention, the image sensor includes a holding stage 40 and a special set of clock signals $\phi X$ employed in conjunction with scan generator 50. This allows the signals applied to the transfer gates 20, 21, 22, to transfer a portion, for example, a tenth, of the accumulated charge into the vertical shift register in each clock period. By transferring the charge in relatively small amounts, the need for a large vertical shift register is eliminated, yet the photoelements may still accumulate large amounts of signal charge. As each smaller packet of charge is transferred into the shift register, the shift register electrodes are appropriately pulsed to advance the charge toward the holding stage 40, and the transfer gate clocked to lower the barrier further and release the next charge packet. After transfer of all the charge from a given photoelement via the shift register into the holding stage 40, the charge accumulated in the holding stage 40 is transferred into the horizontal output register 45 by applying a signal to another transfer gate electrode (not shown) which separates stage 40 from register 45. The holding stage 40 consists of a long electrode extending along the output register 45. By forming the electrode on alternating regions of thin and thick insulating material, a series of electrically separated potential wells is created when a voltage is applied to the electrode.

The partial transfer of charge from the photoelements is achieved by the combination of scan generator 50 and the clock signal $\phi X$ applied to node 52. (The combined scan generator 50 and node 52 are referred to herein as scan generator means. The $\phi X$ clock signal is shown in FIG. 2. The operation of the scan generator 50 and clock signal $\phi X$ are described below with respect to a single row of transfer gates 20. All other rows operate in a corresponding manner.

After the necessary charge integration time when the charge accumulated in the photoelements in a row is to be read out, scan generator 50 applies a logical high signal to the gate of transistor 60 to turn it on. A series of pulses having progressively increasing potential, as shown in FIG. 2, then are applied to an electrode of transistor 60 via node 52. Each pulse corresponds to one clock period for shift registers 30, 31, 32. In the preferred embodiment the series consists of 10 progressively increasing pulses. It will be appreciated, however, that as many pulses as desired may be employed, depending upon the levels of signal charge expected to be accumulated in the photoelements and the video line scan period and vertical CCD clocking period desired.

Thus, in the preferred embodiment, during a first clock period, the signal $\phi X$ will cause approximately 10% of the accumulated charge (assuming the photoelement is full) to transfer from the photoelements 10 past the transfer gates 20 into the vertical CCD registers. Then the charge in each element of the vertical CCD registers is shifted one electrode toward the top and the next pulse of signal $\phi X$ applied to the transfer gates. This will cause the next 10% of the accumulated charge to transfer. After ten pulses, all of the charge will have been transferred into the vertical CCD registers. Scan generator 50 then will turn on the transistor 61 in the next row, and the next series of pulses will be applied. After ten pulses, all of the accumulated signal charge from that row of photoelements will have been transferred into the register and shifted toward the holding stage 40. Then the third row of photoelements will be emptied into the register, etc.

The holding stage 40 and output register 45 must be sized appropriately to hold at least as much charge as a single photoelement. Holding stage 40 in effect allows the original signal charge to be reaccumulated before being sensed. In contrast, the sensitivity limiting vertical shift registers 30, 31, 32, will be sized only to hold one-tenth this amount (or less if more than 10 pulses are used for transfer). The transfer of charge from the holding stage into the horizontal register 45 is controlled by the line scan period clock signal which is applied to the transfer gate separating the stage 40 from register 45.

FIG. 2 illustrates the waveform of the $\phi X$ clock signal. As shown 10 progressively increasing pulses are used in each video line scan period. Each pulse is applied at the same frequency as the vertical shift register clock. During the first pulse the potential barrier under the transfer gate is slightly lowered, in the example, amounting to one-tenth of the depth of the potential well beneath the photoelement. If the photoelement is full, one-tenth of the charge will transfer. If it is not full, only the charge in the top one-tenth of the full photoelement well capacity will transfer. During the second pulse, a a lower barrier is created and more charge transfers. The process continues skimming the charge from the well until the barrier is completely lowered.

FIG. 3 illustrates the contents of register 32 in the image-sensing array at a selected instant during operation of the invention. One element 32a of the shift register contains the last tenth of the signal charge from a photoelement row 16. The next ten stages of the shift register contain the signal charge from a photoelement in row 17, while the next stages of the register contain the signal charge from row 18. After the necessary number of vertical CCD clocking periods and video line scan periods, all of the signal charge from all of the rows of photoelements will have been shifted to the top of the CCD registers and into the holding stage 40 with each video line scan.

FIG. 4a is a cross-sectional view of a portion of the structure of FIG. 1, illustrating a photoelement, the associated transfer gate, and a corresponding element of the vertical CCD register, all as employed in an infrared image sensor. The photoelement consists of a region of a silicon substrate 42 between two N-conductivity type regions 40. Positioned adjacent the photoelement is a transfer gate electrode coupled to one of the connecting lines which receives the $\phi X$ signal. On the opposite side of the transfer gate from the photoelement is an electrode for the vertical CCD shift register which is coupled to receive a vertical transfer clock signal. The photoelement, transfer gate, and shift register element shown in FIG. 4a are separated from adjacent columns of such elements by oxidized isolation regions 44.

The structure shown in FIG. 4a may be fabricated using well known semiconductor fabrication processes. Typically, such processes will protect the silicon substrate 42 while forming oxidized isolation regions 44. Then with appropriate masks and ion-implantation or diffusion steps, the N-type regions will be formed in the substrate, following which the substrate is reoxidized and polycrystalline silicon electrodes are deposited and defined.

The operation of the structure shown in FIG. 4a may be more readily understood with reference to the potential diagram shown in FIG. 4b. In the region defining the photoelement, a potential barrier of height $V_1$ (measured from the N-type regions 40) is created within which electrons accumulate in response to ambient light. During the integration period charge accumulates to a level 46 which is determined by the intensity of the infrared light striking the device. Absent any signal on the transfer gate, the charge will continue to accumulate in the photoelement until it saturates. Before saturation, however, an appropriate signal $\phi X$ applied to the transfer gate lowers the level of the potential barrier between the photoelement and the vertical CCD register. As shown in FIG. 4b by applying a signal $\phi X$ to a transfer gate which lowers the level of the barrier by potential $V_2$, a certain volume 47 of charge flows over the lowered barrier into the well beneath the vertical CCD register. During another clock cycle, as depicted in FIG. 2, the potential falls to a level $V_3$ allowing an additional volume 48 of charge to flow into the vertical CCD register. As explained above, by this instant the charge packet 47 will have been shifted to a shift register element which is one element closer to the holding stage 40. Finally, after as many pulses as necessary the highest pulse $\phi X$ is applied to the transfer gate, to lower the barrier below $V_1$, thereby allowing all of the remaining accumulated charge 49 to flow into the shift register.

As discussed, the scan generator and the signal $\phi X$ combine to control the transfer gates. Scan generators such as scan generator 50 are well known in CCD image-sensing applications. The scan generator responds to a start field signal to scan the control transistors 60, 61, 62, etc. (see FIG. 1). The $\phi X$ signal used to allow partial transfer of the charge from each of the photoelements may be generated using any desired technique. In the preferred embodiment I employ a circuit such as described in conjunction with FIG. 5.

FIG. 5 is a block diagram of a transfer pulse generator. N-bit counter 50 receives high frequency pulses from the master clock source 52, which is also used to synchronize all other CCD clock signals, for example, the line scan and shift register clocks. The bit count N is determined such that in each video line scan period the numerical output of the counter increases from zero to the maximum value.

A transfer clock signal, derived from the vertical register CCD clock signal, is supplied to a buffer 55. Buffer 55 links the numerical ramp output from counter 50 to the input terminals of digital-to-analog converter 56 whenever the transfer clock signal is asserted. When the transfer clock signal is not asserted, the buffer clamps input nodes to logical zero. The analog output signal φX from converter 56 is amplified and level shifted as necessary by driver 58.

A preferred embodiment of the multipacket vertical transfer area imaging device of my invention has been described above. Although specific details have been provided with respect to its structure and operation, these details should be understood to be illustrative of the invention. The scope of the invention is set forth in the appended claims.

I claim:

1. Apparatus for sensing an image comprising:
   photoelement means including a plurality of photoelements for accumulating charge in response to sensed conditions;
   barrier means disposed adjacent the photoelement means for controllably releasing the charge from the photoelement means;
   register means separated from the photoelement means by the barrier means for receiving the charge released from the photoelement means; and
   scan generator means connected to the barrier means for supplying pulses thereto, a series of pulses being required during the transfer of the charge form the photoelement means to the register means.

2. Apparatus as in claim 1 further comprising output register means for transferring charge to an output node; and
   wherein the register means is disposed to transfer charge from the photoelement means to the output register means.

3. Apparatus as in claim 2 wherein the output register means comprises:
   charge-holding stage means disposed to receive charge from the register means and accumulate it during the series of pulses; and
   output stage means disposed to receive charge from the charge-holding stage means after the series of pulses and supply it to the output node.

4. Apparatus as in claim 3 wherein the plurality of photoelements are arranged in x columns and y rows.

5. Apparatus as in claim 4 wherein the barrier means comprises a plurality x·y of transfer gate electrodes, a separate electrode being associated with each of the photoelements.

6. Apparatus as in claim 5 wherein the scan generator means comprises:
   a plurality y of connecting lines, a separate connecting line being associated with each row of photoelements and being electrically connected to each of the transfer gate electrodes in that row;
   a plurality y of switching means, a separate switching means being connected between each connecting line and a common node; and
   wherein the scan generator means is connected to supply the series of pulses to the common node.

7. Apparatus as in claim 6 wherein the scan generator means further comprises a scan generator connected to control all of the switching means for selectively connecting one of the plurality y of connecting lines to the common node to receive the series of pulses.

8. Apparatus as in claim 7 wherein each of the switching means comprises a transistor having a first electrode connected to the common node, a second electrode connected to the connecting line, and a control electrode connected to the scan generator.

9. Apparatus as in claim 4 wherein the register means comprises a plurality x of shift registers.

10. Apparatus as in claim 9 wherein the charge-holding stage means comprises a plurality x of electrodes, a separate electrode being disposed at an end of each of the shift registers.

11. Apparatus as in claim 10 wherein the output stage means comprises an additional shift register disposed adjacent the plurality x of electrodes in the charge-holding stage means.

12. Apparatus for sensing an image comprising:
   an array of photoelements for accumulating charge arranged in x columns and y rows;
   a plurality x of shift registers for transferring charge, a separate shift register being disposed alongside each column of photoelements;
   a plurality of transfer gates also arranged in x columns and y rows, a separate transfer gate separating each photoelement from the shift register alongside it;
   a charge-holding stage having a plurality x of charge storage electrodes, a separate charge storage electrode being disposed to receive charge from each of the shift registers;
   a plurality y of connecting lines, a separate connecting line being electrically connected to all of the transfer gates in each row; and
   means for supplying a series of electrical pulses to each connecting line to thereby cause any charge accumulated in the photoelements having transfer gates connected to that connecting line to be transferred into the shift registers in a plurality of separate charge packets.

13. A method of increasing the charge-handling capability of a shift register wherein a photoelement for accumulation of charge is separated from the shift register by an electrically-controllable barrier, the method comprising:
   during a first period accumulating electrons in the photoelement;
   during a second period applying a progressively increasing series of pulses to the barrier to cause the accumulated electrons to be transferred from the photoelement in a plurality of separate charge packets into the shift register.

14. A method as in claim 13 further comprising:
   during the second period shifting the contents of the shift register to cause each of the plurality of separate charge packets to be introduced into an element of the shift register which does not have any other packet already therein.

15. A method as in claim 14 further comprising:
   following the second period performing a step of accumulating all of the separate charge packets from the photoelement in a single potential well.

16. A method as in claim 13 wherein the step of during a first period comprises establishing a potential well beneath the photoelement.

17. A method as in claim 16 wherein the step of establishing comprises biasing an electrode disposed over the potential well.

18. A method as in claim 13 wherein the step of during a second period further comprises supplying the progressively increasing series of pulses to the barrier to establish a progressively deeper potential well between the shift register and the photoelement.

* * * * *